Nov. 14, 1950  T. R. SMITH  2,530,091
PRESSURE RELIEF VALVE
Filed Feb. 8, 1946

INVENTOR.
Thomas R. Smith
BY
Parkinson & Lane
Attys.

Patented Nov. 14, 1950

2,530,091

UNITED STATES PATENT OFFICE 2,530,091

PRESSURE RELIEF VALVE

Thomas R. Smith, Newton, Iowa, assignor to The Maytag Company, Newton, Iowa, a corporation of Delaware Application February 8, 1946, Serial No. 646,311

8 Claims. (Cl. 137—53)

The present invention relates to a novel valve construction and especially to a pressure relief valve so constructed and arranged as to provide a positive seal below the release pressures.

Among the objects of the present invention is the provision of a novel pressure relief valve provided with a seal that is positive and self-sealing in operation. In the preferred embodiment, the invention comprehends a resilient sealing element substantially cup-shaped and provided with a depending sealing lip or skirt having sealing contact with an upstanding valve seat, the sealing element being carried in a spring-pressed plunger and mounted in such manner that extrusion of the seal is prevented under all operating conditions.

A further object is to provide a novel construction of relief valve that may be adjusted to any desired pressure, and when adjusted, seals positively below the release pressures.

Further objects are to provide a construction of maximum simplicity, efficiency, economy and ease of assembly and operation, and such further objects, advantages and capabilities as will later more fully appear and are inherently possessed thereby.

The invention further resides in the construction, combination and arrangement of parts illustrated in the accompanying drawing, and while there is shown therein a preferred embodiment, it is to be understood that the same is susceptible of modification and change, and comprehends other details, arrangements of parts, features and constructions without departing from the spirit of the invention.

Figure 1:
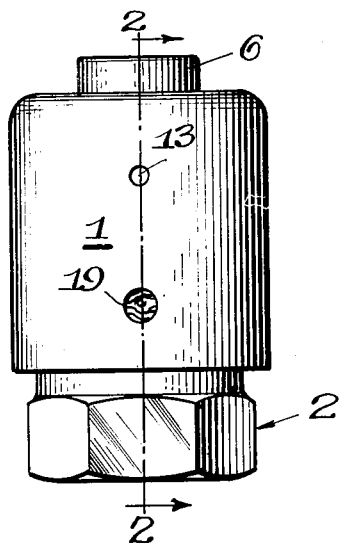
Figure 1 is a view in side elevation of the novel relief valve.
Figure 2:
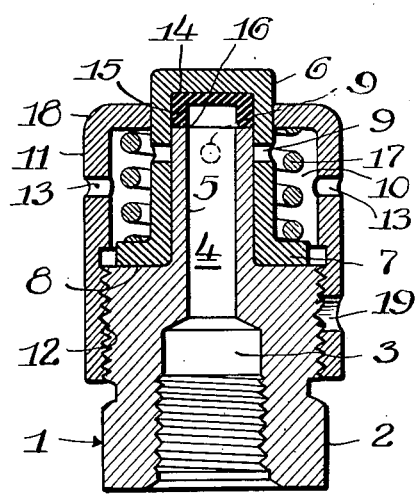
Fig. 2 is a view in vertical cross-section through the relief valve taken on the line 2—2 of Fig. 1 and showing the valve in closed position.
Figure 3:
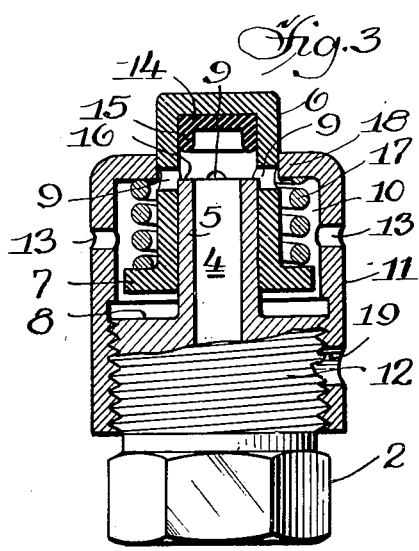
Fig. 3 is a view, part in vertical cross-section taken in the same plane as Fig. 2, and part in side elevation, but showing the relief valve in open position.

Referring more particularly to the novel embodiment selected to illustrate the invention, the present relief valve comprises a valve body 1 interiorly threaded at its lower end 2 for hydraulic connection. The exterior of this lower end is preferably hexagonal or of other shape so as to permit it to be securely gripped by a wrench.

The valve body is provided with an inlet 3 merging into a reduced passage 4, and at its upper end is provided with a reduced elongated tubular section 5. Slidably mounted upon this reduced tubular section is a hollow plunger 6 formed at its lower end with an outwardly projecting or flaring flange 7 adapted to seat against a shoulder or stop 8 provided on the valve body when the plunger is in its lowered or closed position. Intermediate the ends of the plunger are provided a plurality of discharge ports 9 adapted to discharge into an annular space 10 provided between the exterior of the plunger and the interior of a cap 11, the latter having threaded connection at its lower end with the threads 12 upon the body of the valve. Suitable discharge ports 13 are provided in the exterior of the cap.

A cup-shaped resilient sealing element 14 is conformably positioned in the upper hollow end of the plunger and is provided with a depending sealing lip 15 adapted to seat against the upper end 16 of the upstanding tubular part 5 on the valve body when the valve is in closed position. A spring 17 is positioned between the flange 7 and the upper end 18 of the cap in such manner as to normally hold the plunger in its lowered or closed position, with the flange 7 seating against the shoulder 8 and with the sealing lip or skirt 15 of the sealing element 14 seating upon or contacting against the seat 16. It is to be noted that in this position the discharge ports 9 are spaced a considerable distance below the seat or end 16 of the upstanding tubular section 5, and as the parts 5 and 6 telescope in close relation discharge of the fluid under pressure is largely prevented.

It is only when the pressure is above that at which the valve is designed to open that the spring 17 is sufficiently compressed as to permit the pressure in the inlet 3 to raise the plunger 6 sufficiently to break the seal between the sealing lip 15 and its seat 16 and to dispose the discharge ports 9 above the end of the seat 16. When so related, these ports permit passage of the fluid under pressure through the ports 9 and outwardly through the ports 13 in cap 11. The seal 14 is so constructed and dimensioned that when the valve is closed and the flange 7 seats on the shoulder 8, the seal will be under a small amount of endwise compression.

The spring 17 has its tension adjusted by means of the cap 11 which is threaded onto the exterior of the valve body 1. This cap may be screwed inwardly or outwardly to obtain the proper adjustment on the spring 17, and when such adjustment is secured the cap 11 may be locked in place by distorting the threads 12 on the body 1 through the hole or opening 19 provided in the side or circumferential wall of the cap. Any suitable means such as a flat-ended punch may be employed for distorting the threads and thereby locking the cap in its adjusted position.

In operation, as pressure is applied through the connection at the bottom of the valve body 1, the seal 14 which has its sealing lip seating against seat 16 at the end of the reduced tubular section 5 of the valve body, is forced outwardly in all directions and tightly into the corner formed by the upper end of this tubular section and the inside diameter at the upper end of the plunger 6. By reason of this construction the seal is self-sealing in operation as it is forced into this corner, which is the only point or location where leakage may occur.

As the pressure is raised, this increased pressure against the underside of the cup-shaped sealing ement forces it and the plunger 6 in which it is carried upwardly against the tension of the spring 17 until the sealing lip 15 is disengaged from the seat or upper end 16. Extrusion of the sealing element is prevented by the fact that the plunger 6 must move upwardly a predetermined distance before it uncovers the port openings 9 in the plunger. Release of pressure is permitted when these openings 9 reach the top of the tubular section 5 and allow the fluid under pressure to pass from the interior of the tubular section, underneath the seal and outwardly through the openings 9 and the openings 13 in the cap 11. These openings 13 in the cap may be of any desired number and size and are suitably spaced about its periphery to thereby vent the cap and permit the space 10 between the plunger 6 and cap 11 to be at the same pressure as the exterior of the valve.

Having thus disclosed my invention, I claim:

1. A pressure relief valve comprising a valve body having an inlet, a reduced upstanding tubular part and an encompassing shoulder, a plunger telescopically received on the upstanding tubular part and provided with a flange adapted to engage the shoulder when the plunger is moved to closed position, a resilient sealing element carried in the plunger and having a depending sealing lip adapted to seat upon the upper end of the tubular part, a cap mounted on the valve body and encompassing the plunger, a spring disposed between a part on the cap and the flange on the plunger for normally forcing this plunger into closed position, and relief ports in the plunger and cap, the ports in the plunger being so disposed that the latter must be moved an amount sufficient to carry the sealing element completely away from its seat before the valve is opened.

2. A pressure relief valve comprising a valve body having a hydraulic connection at one end and provided with an elongated tubular section at the other end providing a passage communicating therewith, a plunger telescoped upon the tubular section and closed at its outer end, a cup-shaped resilient sealing element carried in the closed end of the plunger and adapted to seat upon the end of the tubular section, relief ports in the periphery of the plunger and normally spaced from the end of the tubular section and sealing element whereby the plunger must be moved an amount sufficient to completely withdraw the sealing element from contact with the end of the tubular section before the pressure is released, and interengaging parts on the valve body and plunger providing a positive stop for limiting the axial compression on the sealing element.

3. A pressure relief valve comprising a valve body having a hydraulic connection and an upstanding tubular part provided with a passage for fluid under pressure and a valve seat, a spring-pressed plunger slidably mounted upon the tubular part and provided with a closed outer end, a cup-shaped flexible sealing element normally seating upon the valve seat and disposed within the closed outer end of the plunger, discharge ports in the periphery of the plunger but disposed below the valve seat except when the plunger and sealing element have been moved a sufficient distance whereby the sealing element is completely withdrawn from its sealing contact with the valve seat, and interengaging parts on the valve body and plunger providing a positive stop for limiting the axial compression on the sealing element.

4. A self-sealing pressure relief valve comprising a valve body having a hydraulic connection and an upstanding tubular part forming a fluid passage and provided with a valve seat at its upper end, a spring-pressed plunger slidably mounted upon the tubular part, a cup-shaped flexible sealing element normally seating upon the valve seat and disposed within the upper end of the plunger, and discharge ports in the periphery of the plunger but disposed below the valve seat except when the pressure reaches a predetermined amount and moves the plunger and the sealing element away from its valve seat, the sealing element when in closed position being under endwise compression and forced into the recess formed by the tubular part and the interior of the plunger by the pressure of the fluid in said passage.

5. In a construction adapted to prevent the flow of a fluid through an opening, an upstanding member provided with an opening, a seating surface encompassing the opening on the end of said upstanding member, a slidable plunger provided with ports, said plunger telescopically mounted on the upstanding member and conforming thereto, a resilient cup-shaped sealing element retained within the plunger in endwise compression with said seating surface when the plunger is in closed position and adapted to seat on the seating surface with the open end facing said opening in such manner that fluid pressure in the opening tends to expand the sides of the cup-shaped seal against the inside of the plunger and into the recess formed by the inside of the plunger and the seating surface, said ports in the plunger being so located that the resilient sealing element breaks away from the seat when the plunger is raised and before the ports are opened.

6. In a valve construction adapted to restrict the flow of fluid below a predetermined pressure, comprising a body member provided with a passage extending therethrough and having one end of the passage adapted to be placed in communication with a source of fluid under pressure and the other end constituting an outlet having a valve seat disposed thereabout, a hollow movable plunger provided with a closed end portion encompassing the outlet opening and mounted for movement toward and away from the body member, a self-sealing cup-shaped resilient sealing element having an outwardly projecting edge conforming to and disposed in the closed end of the hollow plunger with its projecting edge disposed adjacent the valve seat, said plunger being also provided with fluid pressure escape passages disposed below the projecting edge of the sealing element and normally maintained covered by the body member, stop means for limiting the inward movement of the plunger toward the body member after the projecting edge of the sealing element engages the seat to thereby limit axial compression of the sealing element, an abutment mounted on the body, and biasing means between the plunger and abutment and acting on the plunger for maintaining it in contact with the stop and the seal in contact with the seat below a predetermined low pressure, said plunger and seal being movable by fluid pressure above a predetermined value and in opposition to the biasing means to remove the seal from its seat and upon further movement of the plunger the escape passages are uncovered by the body member and placed in communication with the outlet opening to permit flow of fluid therethrough.

7. A self-sealing pressure relief valve comprising a valve body member having an opening for the passage of fluid therethrough, one end of the passage being adapted to be connected to a source of fluid under pressure and the other end constituting an outlet and provided with a valve seat disposed thereabout, a hollow movable plunger having a closed end facing the valve seat and encompassing the outlet and mounted for movement toward and away from the body member, a self-sealing cup-shaped resilient element having a depending sealing lip disposed in the closed end of the plunger with its sealing lip projecting toward the valve seat, said plunger also being provided with fluid pressure escape passages communicating with the interior of the plunger below the lowermost edge of the sealing element and normally covered by the body member, stop means for limiting the inward movement of the plunger after the escape passages are covered and the resilient seal is compressed axially a predetermined amount by the valve seat, an abutment on said body member, and biasing means including a preloaded spring between the abutment and plunger and acting on the plunger for maintaining the same against the stop and the sealing lip against the seat, said plunger being movable by fluid pressure above the spring loading away from the stop and the seal away from the seat and upon further movement of the plunger the escape passages are uncovered to permit the flow of fluid through the outlet, said abutment being adjustable with respect to the body member for varying the loading on the spring.

8. A self-sealing pressure relief valve comprising a valve body having a centrally disposed passage extending therethrough with one end adapted to be connected to a source of fluid under pressure and having an annular reduced projecting portion at its opposite end provided with an outlet from the passage and a flat radially extending valve seat disposed about the outlet, and said body member having a radially extending shoulder at the base of the projecting portion to provide a stop, a hollow plunger having a closed end telescopically mounted on the projecting portion and an outwardly extending flange at the opposite and open end adapted to engage the stop on the valve body when the plunger is in closed position, a self-sealing cup-shaped resilient element including a depending sealing lip conforming to and disposed in the plunger with its lip adjacent the valve seat and axially compressible a limited amount dependent upon the engagement of the flange and stop, said plunger also being provided with fluid pressure escape ports opening into the hollow plunger below the sealing lip and normally covered by the projecting portion and adapted to be placed in communication with the outlet in the valve body upon a predetermined movement of the plunger in an opening direction after the sealing lip has been removed from the valve seat by fluid under pressure, a spring disposed about the outer periphery of the plunger engaging the flange on the plunger to hold the same against the shoulder below a predetermined fluid pressure, and a hollow cap member for engaging the opposite end of the spring and disposed and enclosing the spring and a portion of the plunger, said cap member being adjustably mounted on the valve body and being provided with an opening therethrough for the passage of fluid when the plunger is moved against the action of the spring to unseat the sealing lip and then to uncover its escape ports.

THOMAS R. SMITH.

REFERENCES CITED

The following references are of record in the file of this patent:

UNITED STATES PATENTS

| Number | Name | Date |
| --- | --- | --- |
| 727,476 | Starr | May 5, 1903 |
| 772,668 | O'Brien | Oct. 18, 1904 |
| 850,626 | Creighton | Apr. 16, 1907 |
| 1,798,727 | DeSousa | Mar. 31, 1931 |
| 1,845,290 | Kogstrom | Feb. 16, 1932 |